United States Patent [19]

Schlecht

[11] 3,984,904
[45] Oct. 12, 1976

[54] INTERNAL RETAINING TABS FOR A FILLED PISTON

[75] Inventor: Charles H. Schlecht, York, Pa.

[73] Assignee: Caterpillar Tractor Co., Peoria, Ill.

[22] Filed: Nov. 27, 1974

[21] Appl. No.: 527,720

[52] U.S. Cl. .............................. 29/156.5 R; 92/172; 92/248; 91/488; 264/269; 264/274
[51] Int. Cl.² ........................................ B23P 15/10
[58] Field of Search ............... 29/156.5 R; 509, 520, 29/530; 92/172, 248, 249; 91/488; 264/269, 274

[56] References Cited
UNITED STATES PATENTS

| 2,255,948 | 9/1941 | Swanstrom | 29/509 |
|---|---|---|---|
| 2,385,953 | 10/1945 | Swanstrom | 29/509 |
| 3,187,644 | 6/1965 | Ricketts | 92/248 |
| 3,491,441 | 1/1970 | Belsaas | 264/269 |
| 3,633,467 | 1/1972 | Watanabe et al. | 92/248 |
| 3,707,113 | 12/1972 | Hein et al. | 92/248 |

FOREIGN PATENTS OR APPLICATIONS

| 922,038 | 1/1955 | Germany | 92/249 |

Primary Examiner—C.W. Lanham
Assistant Examiner—Dan C. Crane
Attorney, Agent, or Firm—Phillips, Moore, Weissenberger Lempio & Strabala

[57] ABSTRACT

The invention provides a hollow core filled piston including core retaining means for mechanically interlocking and retaining a core of filler material within the piston against angular and axial displacement. The piston includes a hollow skirt portion defining a stepped-bore cavity, and retaining means for retaining a core of filler material within the cavity comprising a plurality of annular projections formed from the shoulder between the stepped bores. The invention further provides a tool for cutting and displacing segments of the shoulder to form the annular projections.

1 Claim, 4 Drawing Figures

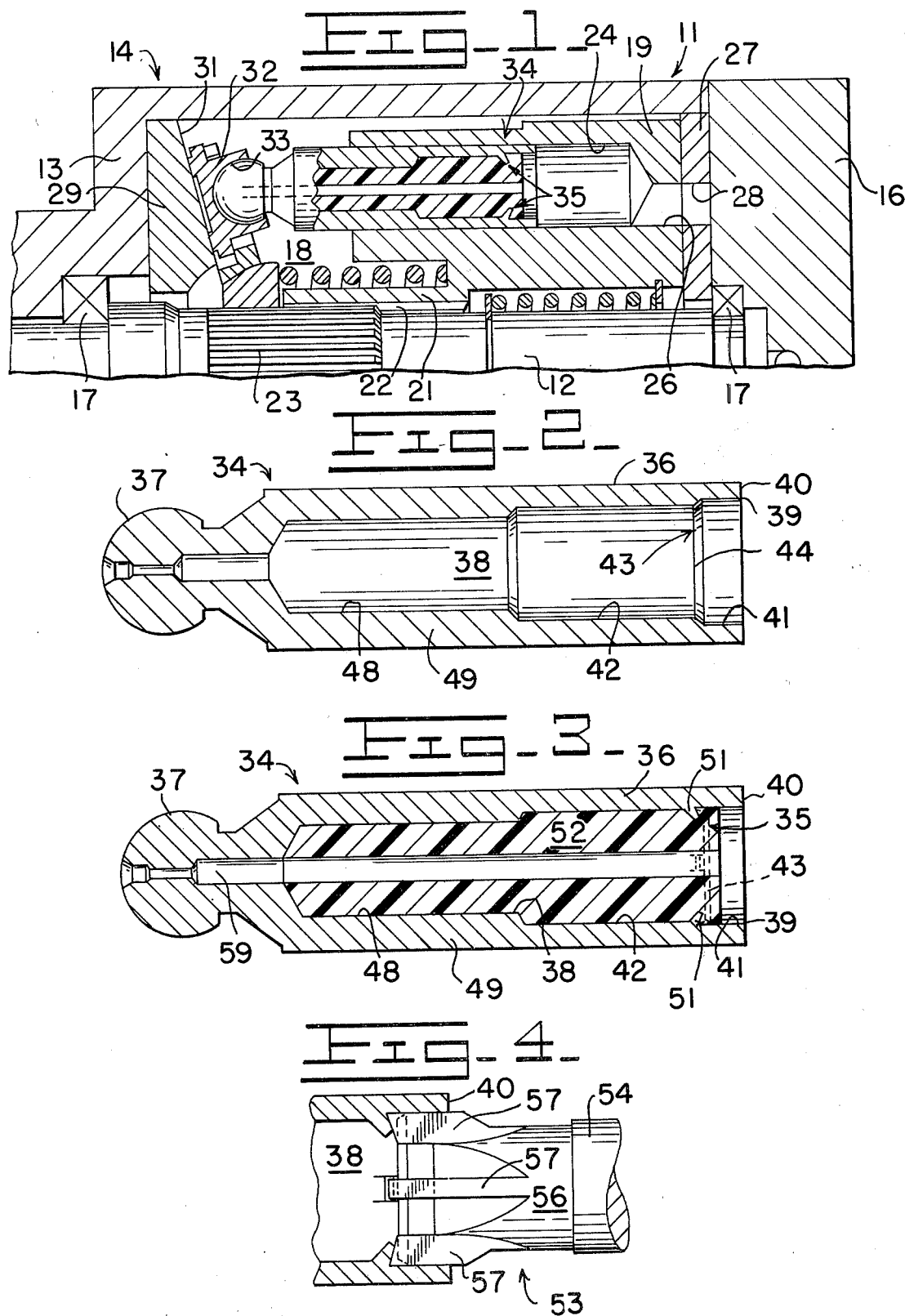

INTERNAL RETAINING TABS FOR A FILLED PISTON

BACKGROUND OF THE INVENTION

This invention relates to fluid translating units such as fluid pumps and motors of the type having reciprocating hollow-skirt pistons. In particular this invention relates to improved retaining means for retaining a core of filler material in the hollow skirt of such pistons, and a method for making such retaining means.

Conventionally, the piston employed in reciprocating-piston fluid translating units contain cavities in the body or skirt portions thereof formed by removing a core of the piston material to reduce the weight of the piston and thus reduce the high inertia forces acting on the piston during operation of the units. This, however, increases the dead volume of fluid which must be moved within the translating unit and tends to decrease the efficiency of these units. Consequently, it is usual to refill these cavities with a material which is lighter in weight than the piston material, but which also possesses a sufficiently high bulk modulus to resist compression under the high pressures produced within these translating units. Such filler material must be positively retained within the piston to prevent displacement during operation of the units and thereby avoid potential severe damage thereto.

Particularly suitable prior art means for retaining a core of filler material within a piston cavity comprise those means for mechanically interlocking the core and piston described in U.S. Pat. Nos. 3,707,113; 1,204,889; 1,433,478; 2,741,518; 3,080,854 and 3,187,644; as well as German Patent No. 922,038 (1955). Other means include those means described in patent application Ser. Nos. 391,337 and 393,045 and 371,666 of common assignment herewith. Retaining means of the mechanically interlocking type have, however, in some instances proven to be relatively expensive to fabricate, and it is therefore desirable to provide retaining means for such filler material which are effective and yet do not incur high attendant fabrication costs.

SUMMARY AND OBJECTS OF THE INVENTION

The invention provides a hollow, core filled piston including means for retaining a core of filler material in the core formed in the skirt portion of the piston against angular and axial displacement, and a method for making such retaining means.

The core-retaining means of the invention includes a plurality of angularly disposed tabs or projections formed on the inner surface of the piston cavity by cutting and displacing segments from the inner wall of the cavity. Preferably, the cutting and displacing of these segments is effected by means comprising a staking tool including a base member having a plurality of circumferentially disposed cutting teeth on the working portion thereof configured for engagement of these teeth with a chamfered surface of a shoulder in the cavity wall when the tool is inserted in the piston cavity. The cutting teeth are shaped and disposed to provide projections of a number and contour sufficient to mechanically interlock and retain the filler material within the cavity against angular and axial displacement therefrom.

It is an object of this invention to provide core-retaining means for retaining a core of filler material within a hollowed-out cavity in the skirt portion of a piston, which means effectively retain the core material against angular and axial displacement from the cavity.

It is another object of this invention to provide effective core-retaining means which do not require extensive machining of the piston.

It is a further object of this invention to provide a simple method for forming effective core-retaining means on the inner surface of a cavity in the skirt portion of a piston.

It is an additional object of this invention to provide a simple tool for forming effective core-retaining means on the inner surface of a piston cavity.

Other objects and advantages of the invention will become apparent from the following description and drawing.

BRIEF DESCRIPTION OF THE DRAWING

FIG. 1 is a cross-sectional elevation of a portion of an axial piston fluid translating unit illustrating in association therewith a piston having a hollowed-out skirt portion filled with a core of material retained in place by the core-retaining means of this invention;

FIG. 2 is an enlarged longitudinal cross-sectional elevation of the piston of FIG. 1, prior to the formation of core-retaining projections, illustrating in detail the stepped-bore piston cavity and the annular shoulder separating the bores;

FIG. 3 is an enlarged longitudinal cross-sectional elevation of the piston of FIG. 1 illustrating in detail the core-retaining projections in phantom, the annular shoulder portion from which they are formed; and FIG. 4 is a cutaway view of the working portion of the chiseling means of this invention shown in the process of forming the core-retaining projections on the piston inner walls.

DETAILED DESCRIPTION OF THE INVENTION

With particular reference to FIG. 1, an axial piston hydraulic pump or motor is generally indicated at 11, and is hereinafter referred to as "pump 11". The pump 11 includes a rotatable drive shaft 12 extending through an end wall 13 of a cylindrical housing 14. A circular head 16 closes the end of the housing 14 opposite the end wall 13, and a pair of bearings 17 support the drive shaft 12 in the end wall 13 and the head 16.

The housing 14 and the head 16 define a chamber 18 within which is disposed an annular barrel 19 in coaxial relationship to the drive shaft 12. The barrel 19 includes a sleeve portion 21 extending toward the end wall 13 and carrying first splines 22 engaging second splines 23 on the drive shaft 12 so that the barrel 19 and the drive shaft are constrained to rotate together. The barrel 19 further includes a plurality of cylindrical bores (one of which is shown at 24) which extend in a direction parallel to the drive shaft 12 and which are in equally angularly spaced relationship thereto.

A plurality of passages, one of which is shown at 26, are formed in the barrel 19 to communicate with each of the bores 24. A circular port plate 27 is disposed between the barrel 19 and the head 16 and includes a pair of arcuate slots, one of which is shown at 28, each of which has a radius equal to the spacing of the passages 26 from the rotary axis of the barrel 19 for communication between the passages 26 and the slots 28.

The pump 11 further includes a cam plate 29 having a flat surface 31 angled relative to the rotary axis of the drive shaft 12 and the barrel 19. A slipper pad 32 is adapted to ride against the flat surface 31 of the cam plate 29, and includes a plurality of spherical depressions one of which is shown at 33, for a purpose to be hereinafter described.

The head 16 of the pump 11 is provided with conventionally arranged inlet and outlet ports (not shown) which communicate with the slots 28.

As thus described, the pump 11 is merely illustrative of a conventional fluid translating unit of the reciprocating-piston type, and is intended to represent such units known in the art.

The pump 11 further includes a plurality of hollow core filled pistons generally indicated at 34, including the core-retaining means of this invention, generally indicated at 35.

As best shown in FIGS. 2 and 3, each of the pistons 34 includes a hollow, elongated cylindrical body or skirt portion 36 attached to a spherical base portion 37 conforming to one of the spherical depressions 33 in the slipper pad 32 for engagement therewith. The pistons 34 are each disposed in one of the bores 24 in the barrel 19 for reciprocation therein.

The skirt portion 36 of the piston 34 defines a cavity 38 extending from a plane rearward of the base portion 37 and communicating with opening 39 in the trailing end 40 of the piston 34. In a preferred form, the cavity 38 includes a first bore 41 coaxial with the skirt portion 36 and communicating with the opening 39 in the trailing end 40, and further includes a second bore 42 coaxial with the first bore 41 and communicating therewith. The second bore 42 is of lesser diameter than the first bore 41, and forms an annular shoulder 43 therewith. As best shown in FIG. 2, the annular shoulder 43 includes a face 44 obliquely disposed with respect to the inner wall of bore 41 and the inner wall of bore 42.

Preferably, the oblique face 44 is formed by chamfering the shoulder 43. However, the oblique face 44 may alternately be formed as an integral part during the process of forming the cavity 38.

Preferably, the cavity 38 further includes a third bore 48 coaxial with the second bore 42 and communicating therewith. The third bore 48 is of lesser diameter than the second bore 42, to provide a lateral wall 49 in the piston 34 having a greater thickness toward the base portion 37 and a lesser thickness toward the trailing end 40 of the piston 34. Such means provides a greater piston strength toward the base portion 37 where it is needed, while eliminating unnecessary weight toward the trailing end 40.

As best shown in FIG. 3, the core-retaining means 35 of this invention include a plurality of annular tabs or projections 51 extending into the cavity 38 sufficiently to permit the projects 51 to engage and mechanically interlock a core of filler material 52. Preferably, the projections 51 are angularly disposed with respect to the wall defining the cavity 38 toward the trailing end 40 of the piston 34.

The projections 51 are formed by cutting into the wall of cavity 38, at the oblique face 44 of the annular shoulder 43 in this instance, to partially detach segments thereof. The thus-partially detached segments are displaced upwardly toward the longitudinal axis of the cavity 38, and forwardly toward the base portion 37 to form the projections 51.

As illustrated in FIG. 4, the projections are formed by cutting into the oblique face 44 of the shoulder 43 at predetermined intervals to partially detach portions of the shoulder from the wall of cavity 38 and the adjacent portions of the shoulder. These partially detached segments are then displaced upwardly and forwardly to the angular position illustrated to form the projections 51. It is of course necessary to cut segments of a sufficient length so that, when displaced, the resulting projections 51 will extend sufficiently far into the cavity 38 to engage and mechanically interlock the core 52.

Conveniently, the annular shoulder may be segmented and the resulting segments displaced as described above to form the projections 51 by an implement comprising a staking tool 53. As best shown in FIG. 4, the staking tool 53 includes a shaft 54 having a working head 56 provided with a plurality of circumferentially disposed cutting teeth 57. The combined diameter of the working head 56 and the cutting teeth 57 is such that the teeth may be inserted in the first bore 41 and yet engage the annular shoulder 43 for segmentation thereof. Means (not shown) are associated with the tool 53 for driving it into the bore 41 and against shoulder 43 to form the projections 51. Such means is common in the art and may comprise any impact or force device of sufficient power to drive the teeth 57 into shoulder 43 and form projections 51. The cutting teeth 57 are of a number and configuration suitable for forming the required number of projections 51 of the desired shape.

After the projections 51 are formed, the cavity 38 is filled with a suitable lightweight filler material with the requisite bulk modulus to resist compression under the forces generated during operations of the unit. Suitable filler materials for forming the core 52 include materials such as described in application Ser. No. 371,666 filed by Barstow, et al. on June 20, 1973, and of common assignment herewith, comprising polymeric materials such as epoxy resins which are introduced into the cavity 38 in liquid form and cured therein to enclose the projections 51.

Preferably, the piston 34 further includes an axial lubricating passage 58 for conducting lubricant through the piston body to the base portion 37 thereof. The passage 58 may conveniently be formed by extending a rod (not shown) through the cavity 38 and into a passage 59 in the base portion 37 prior to curing the core material within the cavity. As described in detail in U.S. Pat. No. 3,707,113, of common assignment herewith, the rod is removed after the filler material is cured, thereby forming the lubricating passage 58.

Although the invention has been described with respect to a preferred embodiment, it will be apparent that many modifications and variations are possible within the scope of the invention, and no limitations are intended except those of the appended claims.

What is claimed is:

1. A process for the production of a lightweight piston of the type used in fluid translating units, wherein said piston includes a base portion for engaging said piston with said unit and an attached skirt portion having a trailing end, said method comprising:

forming a cavity within said skirt portion extending axially from a plane rearward of said base portion to an opening in said trailing end, said cavity including a first bore coaxial with said skirt portion and communicating with said opening and a second bore coaxial with said first bore and communicating therewith, said second bore being of lesser diameter than said first bore and forming an annular shoulder therewith;

introducing into said first bore a tool having a base member including a working head having a plurality of cutting teeth formed thereon, said working head and said cutting teeth having a combined diameter less than that of said first bore and greater than that of said second bore for engagement of said cutting teeth with said annular shoulder;

axially cutting portions of said shoulder in a one step operation to deflect inwardly a plurality of circumferentially spaced projections extending into said cavity; and filling said cavity with a core of lightweight filler material engageable with said projections.

* * * * *